Nov. 4, 1958  W. F. ALLER  2,858,615
GAUGING DEVICE
Filed April 20, 1953  4 Sheets-Sheet 2

INVENTOR.
W. F. Aller
BY Edward T. Noij
atty

INVENTOR.
W. F. Aller
BY Edward J. North Jr
atty

United States Patent Office 2,858,615
Patented Nov. 4, 1958

2,858,615
GAUGING DEVICE

Willis Fay Aller, Dayton, Ohio, assignor, by mesne assignments, to The Sheffield Corporation, a corporation of Delaware Application April 20, 1953, Serial No. 349,655

24 Claims. (Cl. 33—174)

This invention relates to gauging apparatus or the like. It particularly relates to a gauging apparatus of the type disclosed in application No. 194,181 filed by Aller on November 4, 1950.

One object of this invention is to provide an apparatus for rapidly and simply analyzing and directly indicating a number of dimensional qualities of a part.

Another object is the provision of an apparatus having gauging elements associated with distributed points on a part, the gauging elements having corresponding indicating means so arranged and calibrated as to give a clear and easily analyzed presentation of the shape and thickness of the part.

Another object is the provision of an apparatus of the character referred to wherein a part such as a blade for example, having a base or other supporting portion, is held with the supporting portion in a definite reference position in the apparatus whereby the indicating means will enable the visual interpretation of the dimensional characteristics of the part and its disposition relative to its supporting portion.

Another object is the provision of an apparatus of the character referred to wherein the gauging of the adjustments of the part supporting portion necessary to compensate for indications resulting from errors in the relative disposition of the part and its supporting portion will give a measurement of this relative disposition.

Another object is the provision of an apparatus having means for positioning a part to a reference position about an axis thereof and gauging the movements of the part supporting portion from its reference position to determine the relative disposition between the part and its supporting portion.

Another object resides in the method of determining the relative disposition between two portions of a part by positioning one portion in a reference position, noting qualitatively the deviation from a desired normal of the other portion, moving the other portion to its desired normal position and quantitatively gauging the resulting movement of the one portion from its reference position.

More specifically it is an object of this invention to provide an apparatus for rapidly analyzing the critical conditions of a turbine blade or the like including such conditions as contour, thickness, lean, bow, tilt, twist, and centrality.

Other objects and advantages of the invention will be apparent from the following description, the appended claims and the accompanying drawings, in which.

Referring more particularly to the drawings in which the same reference numerals designate like parts in the different views the gauging apparatus as herein illustrated shows an embodiment of the invention adapted for checking the thickness, contour, lean, bow, tilt, twist and centrality and so forth of a curved blade such as a turbine blade. It should be understood, however, that the invention is not limited to these particular functions and that other articles may be gauged of any size or shape and the term "workpiece" as herein used is to designate any particular articles that may be gauged.

Figure 1:
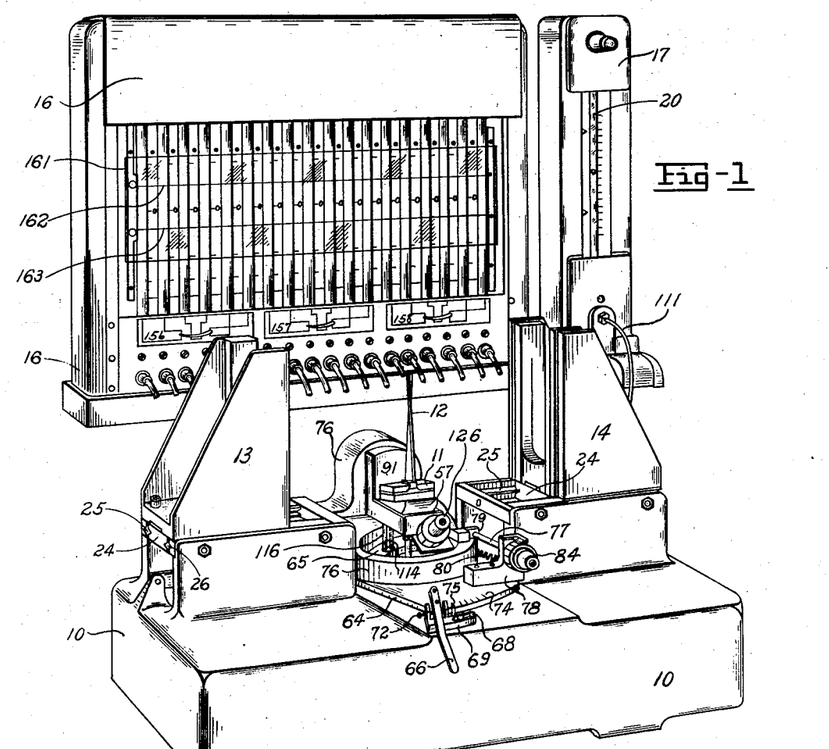
Figure 1 is a perspective view of a gauging apparatus embodying the present invention and showing the general association of the indicating panels, the gauge head carriers and the cradle which supports and positions the turbine blade or other workpiece to be gauged.
Figures 2, 7:
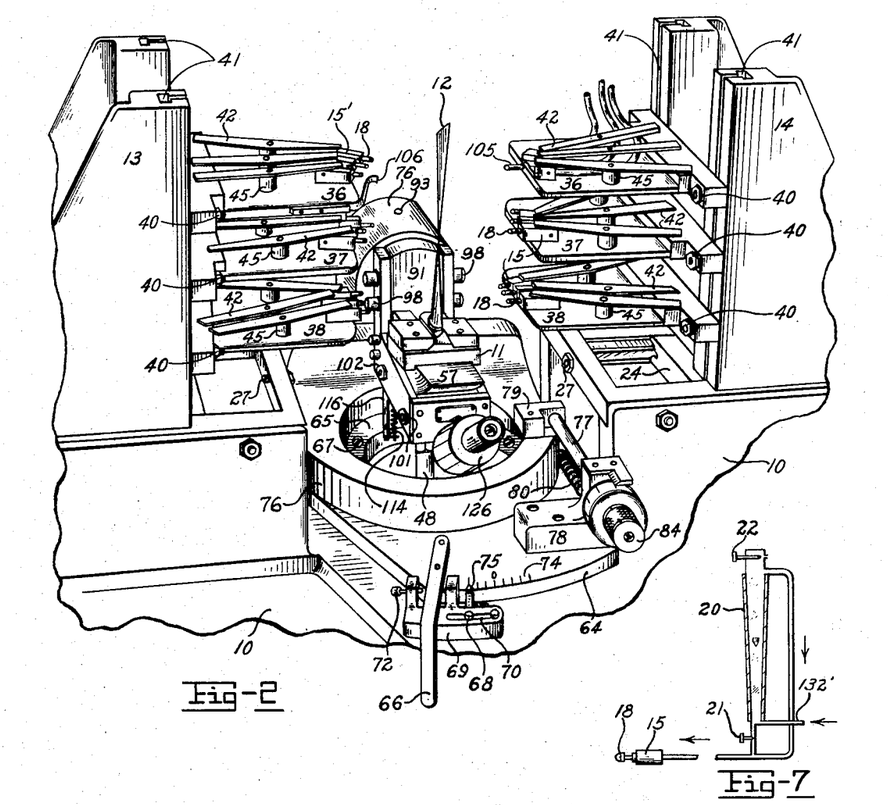
Figure 2 is a more detailed perspective view showing the gauge heads mounted on their carriers, the blade support means and the various manually controlled workpiece positioning means.
Figure 7 is a diagrammatic showing of one column indicator and the air flow path to and from it.
Figure 10:
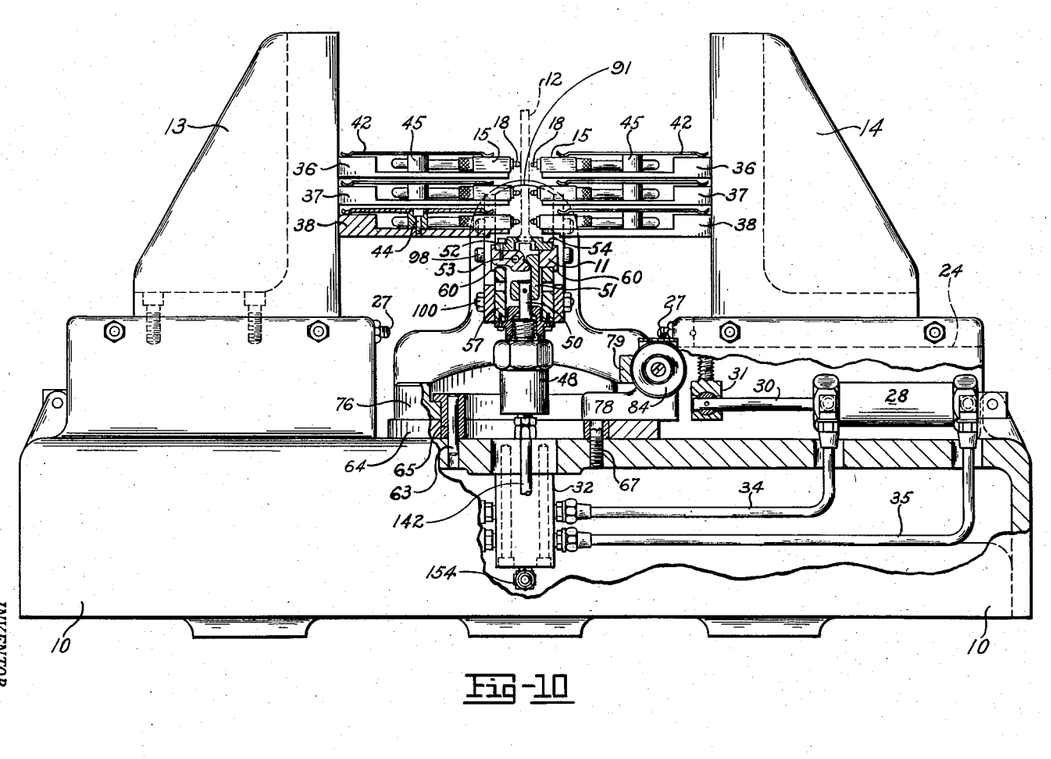
Figure 10 is a view in partial central vertical section of the carriers and the gauge head supports, the workpiece clamping means, the carrier actuating structure.

As will be noted from Figures 1, 2 and 10, the gauging apparatus, in general, comprises a support 10 on which is carried a work holding fixture 11 for holding the workpiece 12. The support also amounts a pair of carriers 13 and 14 at opposite sides of the workpiece, these carriers being mounted for movement from their retracted positions as shown in Figures 1 and 2 to gauging position as illustrated in Figure 10. Each carrier is provided with a number of gauge heads 15 which can be conveniently adjusted so that the gauge head grouping can be readily changed to accommodate the particular shape or size of the workpiece to be gauged. Each of the gauge heads 15 has gauging means for cooperation with the workpiece and controls the operation of an indicating or measuring device, as shown in a multiple column panel 16 and the single column unit 17. Each gauge head 15 gauges the deviation of a particular point on the blade being gauged from the position of the corresponding point on a perfect blade with its base held in the same reference position in the apparatus. The several gauge heads and their connected indicating columns cooperate to give a representation of the various dimensional characteristics of the blade and its disposition relative to its base. The work holding fixture 11 is mounted on a cradle which is carried from the support 10 for rocking, tilting and turning movement by adjusting means about a point on the horizontal center line of the blade root to make possible a multiple check of the lean, tilt and twist of the blade in one handling.

Although the invention in its broadest aspects is not limited to the particular form of gauging measurement herein described, it is preferred that the gauge heads 15 should each incorporate a fluid leakage opening controlled by a projecting work contactor 18. The construction and arrangement of the gauge heads themselves are more fully set forth in the Patent No. 2,691,827, issued October 19, 1954.

In general, each of the projecting work contactors 18 has a tapered inner end which controls the fluid leakage through an orifice outlet in the gauge head 15 dependent upon the displacement by the workpiece. The tapered inner end can be situated on either side of the outlet orifice to either move away from the orifice and increase the leakage with inward movement ("reverse acting") or move toward the orifice and decrease the leakage upon inward movement ("normal acting") of the work contactor. A pair of opposing gauge heads 15 and 15' are illustrated schematically in Figure 11 with a "reverse acting" gauge head indicated at 15' and a "normal acting" head at 15.

The flows through these outlet orifices are indicated by flow responsive means such as vertically tapered tubes 20 having indicator floats movable therein in accordance with the amount of flow taking place through these tubes which communicate at their lower ends with a source of air under pressure and at their upper ends with the leakage orifice outlets, the flow through which is controlled by the workpiece itself.

In Figure 7 is shown the air circuit between a single flow tube and its associated gauge head 15. Associated with each flow tube is an adjustment screw as shown at 21 which varies the air bypassed around the flow tube and controls the amplification of the tube. Each tube also includes another adjustment screw 22 by which the float position can be controlled.

The carrier 13 is supported from a plate 24 which is slidably carried on the support 10 by balls situated in V-grooves at 25 and 26 for movement toward and from the work holding fixture 11 (see Figure 1). The inward movement of the carriers is adjustably limited by the screw means shown at 27 in Figure 2.

Reference is made to Figure 10 wherein is shown in more detail the actuating means for the carriers. The actuating structure shown in Figure 10 for the carrier 14 is duplicated for the carrier 13. It comprises an air cylinder 28, the piston of which is connected through a rod 30 and ball joint structure at 31 to the carrier. Air which is controlled by apparatus later described is metered through a manifold arrangement at 32 through tubes 34 and 35 depending upon which direction the carrier is to be moved. Adjustably mounted on the carrier are brackets 36, 37 and 38 (see in particular Figures 2 and 10). A greater or lesser number of brackets may be employed. Each bracket has position adjusting bolts 40 the heads of which are arranged in slots 41 of the carrier. Nuts threaded on the bolts 40 when tightened hold the bracket securely in position along the carrier although it would be obvious that the brackets can be vertically adjusted in a convenient manner to change their locations along the workpiece.

Each bracket supports a series of gauge heads 15 the positions of which on the bracket may be conveniently changed to place them in different gauging positions in accordance with a particular gauging operation to be performed. The lower side of the gauge head is preferably flat in this application so that the gauge head may be clamped tight on the upper surface of the bracket by a holding clamp 42. Each clamp 42 has its inner end supported on a raised portion of its associated bracket and its outer end rests against the upper surface of the gauge head 15. Intermediate its ends the clamp 42 is drawn toward the bracket for securing the gauge head 15 to the bracket by a screw 44 (see Figure 10) which has its head seated in the clamp 42 and which passes through a sleeve 45 and is threaded into the associated bracket.

A number of gauge heads can be placed on each bracket to extend in different directions and to different extents with respect to the workpiece. They are clamped in position, as shown in Figures 2 and 10, so that when the carrier is in gauging position, the work contactors will all be in gauging association with the workpiece of desired form and they are set in this position by means of a master or reference piece of known dimensions as will be more fully described. The various work contactors carried by one of the brackets are thus arranged to contact the workpiece in a common horizontal plane and in a similar manner each of the other brackets carry other series of gauge heads with work contactors positioned so that the workpiece is engaged at several points at each of several geometrical planes or levels to obtain an indication of the surface contour. The carrier 13 is similarly constructed and arranged so as to carry several series of gauge heads so that the other side of the workpiece will be gauged and, by reason of the relationship of the gauge heads at directly opposing gauging zones, the workpiece thickness at each gauging zone can be also determined. For this latter purpose the gauge heads are situated on the carriers 13 and 14 in opposing pairs.

Figure 3:
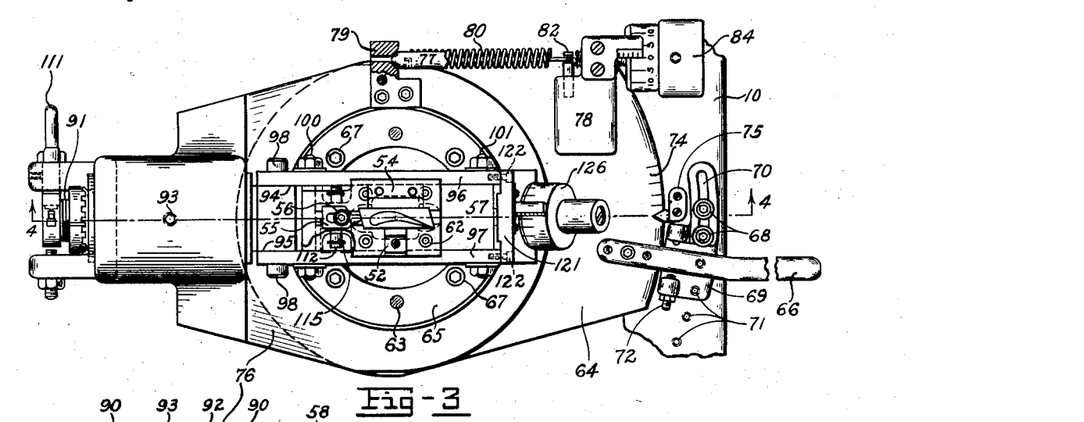
Figure 3 is a detail plan view of the workpiece supporting cradle and associated structure.
Figure 4:
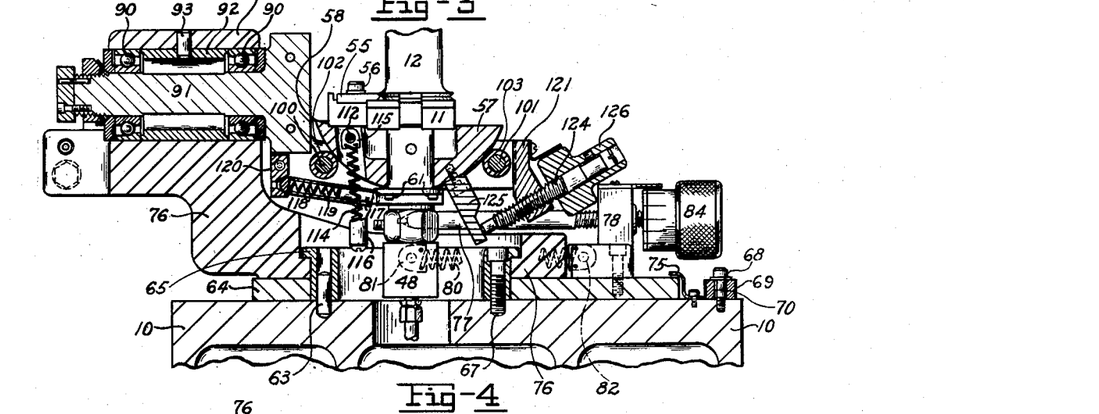
Figure 4 is a vertical central section taken along line 4—4 of Figure 3.

The base of the of the workpiece is held securely by suitable clamping means. As shown, the workpiece has a base with grooves along each side thereof. The clamping means itself is shown more particularly, and in section, in Figure 10. It comprises an air cylinder 48 which is actuated by an air circuit to be later described. The rod 50 is actuated by a piston situated in the air cylinder 48 to pull the camming element 51 down, or release it, to thus pivot the clamping element 52 about the pivot pin 53. The clamping element 52 seats in one groove of the workpiece 12 intermediate its length and clamps it against an opposed clamping element 54. As seen in Figure 3 it is noted that the clamping element 52 does not extend fully along the length of the blade base but that the clamping element 54 which opposes it does. The blade base is situated along the length of the clamping elements in the work holding fixture 11 by a stop 55, which is adjustably fixed by a screw 56 threaded into the work holding fixture 11. The work holding fixture 11 is located on a cradle 57 and is positioned in against the projecting shoulder 58 thereon. This relationship is shown in Figure 4. A modified holding fixture is shown in Figure 2 which employs a rod to force the blade base up against the base locating surfaces and is used when the blade base has inclined surfaces. The work holding fixture 11 is positioned laterally on the cradle 57 by downward projections 60—60 (note Figure 10). The air clamping cylinder 48 is attached to the lower side of the cradle 57 by bolts 61, 61. The work holding fixture 11 is fastened to the upper surface of the cradle 57 by bolts one of which is indicated at 62 in Figure 3.

Figures 5, 11:
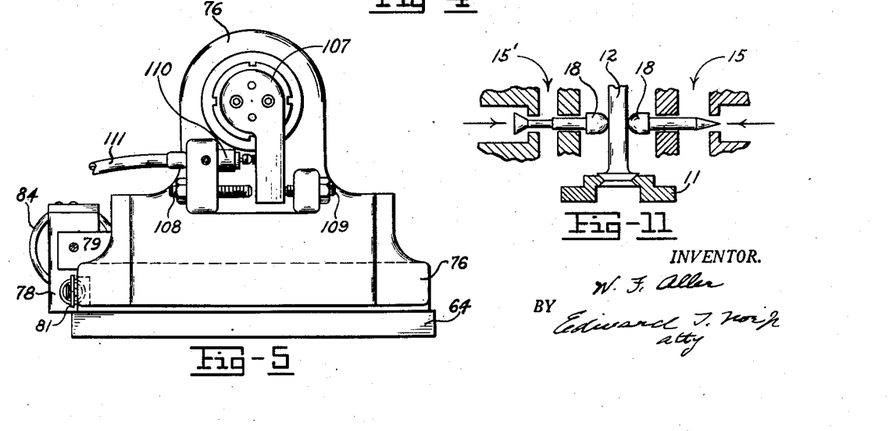
Figure 5 is a rear view of the cradle and associated structure and it shows the control arm and gauge head by which one workpiece characteristic dimension is segregated.
Figure 11 is a schematic showing of an opposing pair of gauge heads in section and their association with a blade being gauged.

The cradle 57 which carries the work holding fixture 11 is adjustably supported on the base 10 by structure shown in detail in Figures 3, 4 and 5. The entire workpiece adjustment means are carried from the support 10 by a quick adjustment plate 64 which is journaled about a gudgeon 65. The gudgeon 65 is located on the support 10 by pins 63 and bolts 67. The quick adjustment plate and the entire workpiece positioning unit which it supports can be adjusted about the gudgeon axis by a rod 66 between adjustable limits determined by a structure 69. The structure 69 can be positioned on the support 10 and fastened in a selected position by bolts 68 within the limits of a slot 70. The structure 69 itself can be moved along the unit within the range of the threaded holes 71. The range of adjustments of the quick adjustment plate 64 relative to the structure 69 can be varied by adjusting the screw 72. The plate is calibrated as at 74, and an indicator is fastened to the support 10 and is shown at 75.

The major carrying member or base 76 is also journaled about the gudgeon 65 and is mounted for adjustment relative to the quick adjustment plate 64. In the illustrative example shown as applied to a turbine blade, the blade is carried for movement about rocking, tilting and turning axis, all of which pass through its base. Adjustments about the longitudinal blade axis (warp or twist) are accomplished by movements of the quick adjustment plate 64 and the base 76 about the axis of gudgeon 65. Adjustments of the base 76 upon the plate 64 are accomplished by a thrust rod 77 which is threaded at its inner end into a support 78 carried by the plate 64 and seats at its outer end in a thrust plate 79 fixed to the base 76. The thrust plate 79, and the base 76, are biased against the thrust of the rod 77 by a tension spring 80 which is fixed at one end to the base 76 by a clamp shown at 81 in dotted outline and at its other end about a pin 82 carried in support 78 from the plate 64. The thrust rod 77 is adjusted axially by turning a micrometer knob 84.

A rocking shaft 91 is carried in the base 76 by bearings 90, 90. The axis of shaft 91 passes through the reference point in the blade base and is the axis about which lean movements of the blade take place. The bearings 90, 90 are situated at either end of a spacer sleeve 92 which is pinned to the base 76 at 93. The rocking shaft 91 has faces 94 and 95 at its outer end upon which flat plates 96 and 97 are bolted at 98 (note Figure 3). The flat plates 96 and 97 are fastened together by tie-rods 100 and 101 which have nuts threaded thereon at their outer ends. Spacer sleeves 102 and 103 are carried by the tie-rods 100 and 101. The cradle 57 which supports the interchangeable workpiece mounting fixtures 11 is supported on the sleeves 102 and 103. Shaft 91 is free for rocking movements in the member 76 and is rocked to a reference position by structure shown in Figure 2. As therein shown, the carrier 14 has a projecting abutment 105 on the upper bracket 36. On the opposed bracket of carrier 13 there is a projecting spring element 106. When the carriers move inward to their gauging positions the spring 106 forces the blade about the axis of the rocking shaft 91 against the abutment 105 to position the blade about its lean axis to a reference position. An arm 107 (see Figure 5) is carried by the inner end of the rocking shaft 91. Its movements are limited by adjustable limits 108 and 109. The arm 107 is in contact with the plunger element of a gauge head 110, similar to those previously described, communicating through tube 111 with the single column unit 17. The function of this latter structure is to segregate any lean error and indicate it on a separate panel. This will be explained in more detail later.

The cradle 57 is carried on the spacer sleeves 102 and 103 for movement about the axis of blade tilt which passes through the reference point in the blade base. A pin 112 is supported through the cradle 57. Springs 114 (one of which appears in Figures 1, 2 and 4) are fastened at their upper ends by clips 115 to the respective ends of the pin 112. Pedestals 116 extend downward and are threaded into each of the side plates 96 and 97. This association is shown for one pedestal in Figures 2 and 4. The springs 114 are fastened at their lower ends to these pedestals 116. Thus the springs 114 serve to bias the cradle 57, as shown in Figure 4, in a counter clockwise direction. The plunger element 117 which is seated in the supporting structure for the cylinder 48 is biased outward by a spring 118 in a plunger chamber 119 which in turn is seated in a thrust plate 120 carried by the rocking shaft 91. This latter spring and plunger structure also serve to bias the cradle 57 in a counter clockwise direction as shown in Figure 4. A cross member 121 is fastened by bolts 122 between the outer ends of the side plates 96 and 97. It has an extended lower portion, as shown in Figure 4, into which is threaded an adjusting screw 124 which abuts a thrust plate 125 fastened to the cradle 57. It will be seen that the springs 114, the plunger contact 117 and the thrust plate 125 cooperate so as to bias the member 57 against the spacers 101 and 102. The screw 124 is furnished with a micrometer adjusting knob 126. Adjustments of this knob 126 serve, in the example illustrated, to rock the blade about its axis of tilt.

The three movements of the cradle 57 are, as previously mentioned, designed to work around a point on the horizontal center line of the blade base which is being gauged in the example illustrated, this thus makes it possible to make a multiple check of lean, tilt, and twist of the blade in one handling of the blade.

The rod 66, the knob 84, and the knob 126 serve to compensate for deviations in the pattern of float positions resulting from twist of the blade with respect to its root or of tilt of the blade with respect to its root and, being calibrated, will give an indication of this deviation. The biasing of the blade about its lean axis by the spring 106 and the projection 105 in conjunction with the gauge head 110 will automatically segregate any lean error from the other indications and will present it in the single column instrument 17 which is calibrated in degrees.

Figure 6:
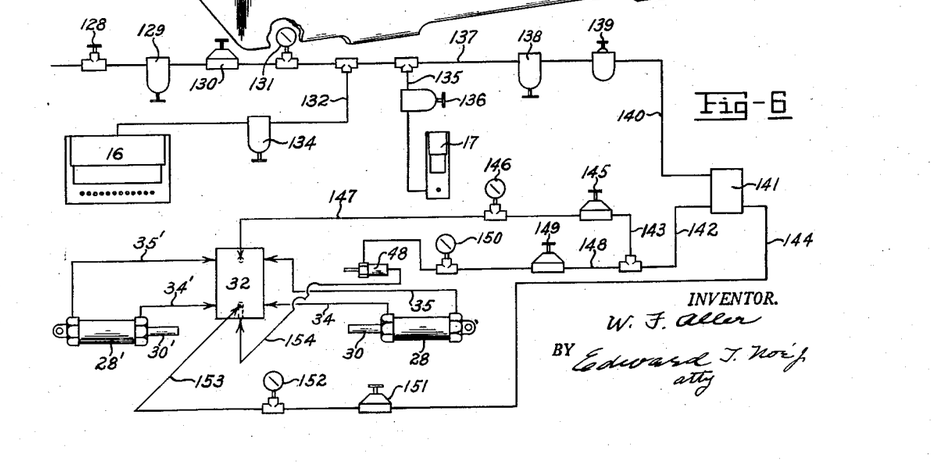
Figure 6 is a diagrammatic representation of the air supply circuit to the indicating panels, the controls and actuating mechanisms for the carriers, and the blade clamping device.

Figure 6 shows schematically the air supply to the multiple column panel 16 and the single column unit 17 and also shows the control and the air circuits to the blade clamping cylinder 48 and the carrier actuating cylinders 28 and 28'.

Air under pressure is supplied through the line valve 128 and then passes through the line filter 129, the line regulator 130, and the gauge 131. At this point the air circuit splits into three separate supply lines.

The first line 132 leads through a filter 134 to the multiple column panel 16 where it supplies air through a manifold to the connections as shown at 132' in Figure 7 for each individual column. Air is led through a line 135, and a filter 136 to the single column unit 17. Conduit 137 leads to a regulator 138 from which regulated air passes through an oiler 139 and through another conduit 140 to a foot operated valve 141. This valve selectively meters air under pressure to one of lines 142 or 144 and exhausts from the other. Line 142 supplies air for the inward movement of the carriers and for the clamping movement of the cylinder 48. From conduit 142 (when air under pressure is supplied to it) air passes through conduit 143 to regulator 145, gauge 146 and conduit 147, in sequence, to manifold 32 where it is led to the outer ends of the cylinders 28 and 28' in order to move the carriers in. Also connected to conduit 142 is a lead 148 which connects to a regulator 149 from whence air passes through a gauge 150 and to the clamping cylinder 48 for moving its piston downward and clamping the blade in the work holding fixture 11. When air under pressure is supplied to line 144, it passes in sequence through a regulator 151, a gauge 152, and a conduit 153 leading to the manifold 32. From the manifold it is led to conduits 34 and 34' to the inner ends of the cylinder 28 and 28', respectively, to move the carriers away from their gauging positions. The manifold also diverts air under pressure through conduit 154 to the lower end of blade clamping cylinder 48 to move its piston up and release the blade. When air is metered through one series of conduits leading from the foot operated valve 141, it is exhausted through the other series as will be apparent from examination of Figure 6.

The line regulator 130 is set for a comparatively high pressure which in one commercial example is 125 pounds. Each of the individual column instruments has its own pressure regulator. The regulator 149 for the blade clamping cylinder 48 is set for comparatively high pressure also, as for example, 25 pounds to insure a positive clamping operation. The regulator 145 which controls the air pressure which moves the carriers in is set for a low pressure to insure that there is no danger of the operator's hands being damaged. The retracting air is supplied at approximately 10 pounds in one commercial example. Air is continuously supplied to the indicating columns while it is metered and controlled by the foot operated valve 141 to move the carriers 13 and 14 in to position the gauge heads for a gauging operation and concurrently clamp the blade in the work holding fixture 11 for gauging. Upon actuation of the foot operated valve in the opposite sense, the carriers 13 and 14 are moved outward, the blade is released, and the apparatus is then situated for the insertion of another blade by the operator and a repeat operation.

The initial step in a setup procedure is the adjustment of the amplification screw 21 and the float level screw 22 of each of the individual columns 20 while the work contactor 18 of the corresponding gauge head 15 is positioned at two predetermined positions relative to the end face of the gauge head by closing the work contactor against two feeler elements interposed in turn between the work contactor and the gauge head. The feeler elements have thicknesses which differ by a desired range. This checks calibration, float position and amplification of the instrument.

After this first step is accomplished for each of the gauge heads and its associated column 20 the gauge heads are then placed on the brackets 36. This initial setup operation is described in detail in the aforementioned Patent No. 2,691,827 issued October 19, 1954.

The gauge heads are individually adjusted on their supporting brackets 36 while their work contacting plungers 18 are in contact with a master or reference piece of known dimensions which is inserted in the work holder and clamped in position. Actually expensive masters are not required to set up this gauging apparatus. Selected good blades can be calibrated on one of the various available instruments and used as setting master. In this process, selected points on the surface of the blade are marked and their deviation in a positive or negative sense from the positions of the corresponding perfect point on a perfect blade are noted. Such a blade is placed in the work holding fixture 11 and clamped therein. The calibrated fixture positioning means are all positioned to reference indications which places the blade base in a reference position in the gauging apparatus. The carriers 13 and 14 are moved inward and then each individual gauge head 15 is adjusted on its supporting bracket 36 while in contact with a calibrated point on the blade until its associated column indicates the amount of known deviation at that point. The gauge heads are then clamped in position by the clamps 42 and their associated structure.

As mentioned, in setting up, first the feelers are inserted, in turn, and the column instruments are adjusted by the adjustment means 21 and 22, and then the gauge heads are positioned until the individual float positions are on, below or above the "zero" line (see Figure 1) according to the aforementioned deviations at the calibrated points at which the work contactors are contacting the blade.

Ordinarily the blades used as setup masters are calibrated without regard to lean, twist or tilt. However, a known amount of lean, twist and tilt may be set into the gauge as desired, by using the micrometer adjustments which position the three-way cradle on the quick adjustment plate. For example, if the blades being gauged differ from the calibrated master only by the angle of twist the apparatus could be set up with the calibrated master and the quick adjustment plate 64 would then be positioned around the known angle and the apparatus is then adapted to gauge the second series of blades. After these setup steps have been accomplished, the gauging apparatus of this invention is set to compare other blades with the theoretical perfect blade.

Figure 8:
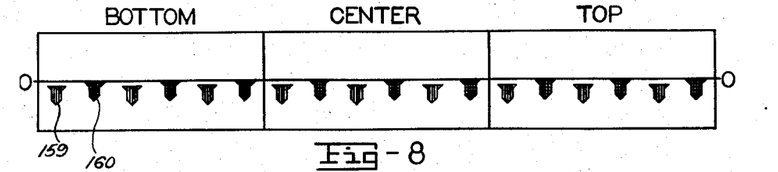
Figure 8 is a diagrammatic representation of the float positions in the multiple column indicator panel with the float graph representing the pattern if a theoretically perfect blade were being gauged.
Figure 9:
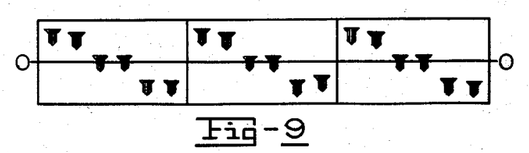
Figure 9 shows the step pattern which the floats would assume in the multiple column panel if a blade having a warp angle or a twist relative to its base were being gauged.

The diagram plates 156, 157 and 158, as indicated in Figure 1, mounted below the columns, show the relative points of contact of the gauge heads at each level of inspection. Figures 8 and 9 are diagrammatic representation of float positions for particular blade conditions. Floats of different colors are used for the respective blade faces. In the embodiment shown red floats are associated with the gauge heads on the left-hand side of the blade and black floats with those on the right-hand side. The columns are arranged in pairs, one for the left, the other for the right-hand side, so that a direct blade thickness measurement at each point as indicated by the comparative positions of adjacent red and black floats. The red floats are supported in tubes 20 which are connected to gauge heads 15' which are mounted on the left-hand brackets to indicate the left-hand side contour of the blade. These gauge heads are the "reverse" acting, that is to say, a falling red float indicates a minus. The red float rises in the column as the work contactor 18 is pushed in and indicates plus as it rises. The black floats are associated with and respond to the gauge heads mounted on the right-hand bracket and "normal" gauge heads 15 are there used. A rising black float indicates minus. As the black float falls in the column as the plunger is pushed in, it indicates plus.

Few, if any, theoretical perfect blades exist. The float diagram for such a blade is shown in Figure 8. The vertical dividing lines in Figure 8 divide the panel into three sections representing the bottom, center, and top level gauging points, respectively.

Thickness measurement is indicated by the difference between corresponding red and black float positions, for example, the pair indicated at 159 and 160 in Figure 8. These red and black floats must be read together as pairs in a thickness consideration. Remembering that a falling red float indicates minus and that a rising black float indicates minus, it would be apparent that with a red float positioned above a black float an indication of thickness beyond the mean dimension is shown; the farther the two are apart, the greater the thickness. Conversely with a black float above a red an indication of a thinness under the mean dimension is shown; the farther the two are apart the thinner the blade. The nearer the two floats of any pair are to each other the nearer the blade is to the mean dimension at that point. No matter what other errors there might be in the configuration of the blade the difference between the positions of the corresponding red and black pairs of floats always shows the amount of thickness, regardless of any other deviation.

Tolerance limits for contour of both sides, including the tolerance of thickness, are usually inscribed on a plastic plate 161 as shown at 162, 163 in Figure 1.

It will be apparent that with left-hand workpiece contour indicated by the pattern of the three red floats at each level of the workpiece and the right-hand workpiece contour indicated by the pattern of the three black floats at each level of the workpiece and with deviation between pairs of red and black floats indicating thickness at their associated points, all characteristics of the blade contour and disposition of the blades with respect to its base are presented graphically on the panel chart.

One example of such a deviation is shown in Figure 9 and will illustrate the concurrent use of the adjusting knobs for positioning the cradle 57. Therein is indicated a float pattern if the thicknesses at all points were proper but if the blade had a condition of warp angle, that is, it was twisted with respect to its base. The graph in Figure 9 shows acceptable thickness and contour on both sides of the blade but with the full length of the rear edge twisted to the left. With the three-way adjustment used, the micrometer adjustment knob 84 and the quick adjustment rod 66 can be turned counterclockwise to bring the float pattern shown in Figure 9 into a horizontal line by repositioning the blade base. The micrometer readings of the knob and adjustment rod 56 will then indicate the twist of the blade with respect to its base in minutes and degrees. Of course, in using the quick adjustment it is first moved to its extreme a known amount, and then this amount is added to the necessary additional movement of the micrometer knob 84.

The clearness of the graphical representation of all blade conditions will now be apparent. Assuming that thickness and contour are proper, the following brief descriptions will point out other conditions indicated on the graphical panel. If the blade were leaning with respect to its base the floats of each level would be relatively horizontally positioned but the various groups would be stepped up or down across the panel depending upon the direction of lean. If the blade were bowed the center float group would be displaced above or below the float groups to either side of it. The tilt condition of the blade with respect to its base would be evident by the progressive variance in blade thickness indication across the panel. If the blade is located too far to the left or the right with respect to its base, the entire horizontal row of floats would be positioned above or below the zero reference line in the panel. All these conditions can be compensated for (except for centrality in the disclosed embodiment) by use of the micrometer adjustment knobs, the quick adjustment or by the automatic lean position means previously described. Thus readings are obtained of these various conditions of disposition of the blade with respect to its base. For normal inspection purposes, tolerances on several conditions of the blade are combined within common limits which are set up in the columns by colored tape placed on the panel 161. Also, as was mentioned, lines are inscribed on the plastic plate which can be positioned to indicate the tolerance limits for contour and for thickness.

It is possible to include the lean indication in such a tolerance marking and in that case the cradle 57 is fixed firmly in place about the axis of shaft 91 rather than being freely swingable and it is not necessary to use an additional column indicator and its associated structure. However, the lean in the disclosed embodiment has been segregated by the spring urged contact 106 and the projection 105 associated with the gauge head 110 as shown in Figure 5. This segregation procedure can be readily carried out for other blade conditions.

Ordinarily there are only five simple steps in the gauging of a blade and the operation does not involve a skilled operator. The blade is placed in the fixture, the foot pedal is depressed to move the carriers inward and clamp the blade in its fixture, the float graph is scanned to determine if the blade conditions are within the tolerances, the foot pedal is then again depressed to retract the carriers and release the blade and the blade is removed and placed in the proper box. The float graphs become easy to read in a short time as the float patterns will become fixed in the operator's mind.

A feature of inestimatable value of this gauging apparatus is its complete flexibility and adjustability to accommodate changes of design in a great variety of workpieces without requiring costly modifications. The gauge head brackets can be positioned at any level vertically. The gauging heads can be clamped in any desired position on the brackets, even below them. Workpieces can be gauged which vary considerably in height, width or contour and still be accommodated by the gauging apparatus shown and other such apparatuses can be simply designed within the scope of this invention to accommodate other ranges of dimensions. Interchangeable work holding fixtures can be used should the workpiece supporting portions vary in contour and size. The gauging apparatus is simply set up and rapid in its operation. Reading the deviation of the float graph from a fixed horizontal line provides a means for rapidly analyzing all critical conditions of a part such as its contour, and its disposition with respect to its base. The use of scribed lines or colored strips on the panel 161 enable the setting up of tolerances with the corresponding utilization of unskilled workers. Any size dimension can be segregated and indicated on a separate panel by automatic positioning. The adjustment means for the member 57 enable the float pattern to be returned to a substantially horizontal line and then by reading the adjustments the amount of these deviations can be determined. Thus these workpieces can be analyzed as rapidly as they can be loaded into and unloaded from the gauging position.

In gauging the deviations of the blade in this example illustrated, a common method of approach is involved in each of the tilt, lean and warp determinations which is believed applicable to many other situations and which does not involve only the apparatus disclosed. Each of these measurements involves first placing the workpiece with its supporting portion in a reference position, noting qualitatively any deviation from a desired range of indicated positions of the workpiece itself, and then placing the workpiece substantially in its desired position by moving the workpiece supporting portion until the various indications fall within desired values. The quantitative measurement of the amount the workpiece supporting portion has to be moved from its reference position in order to position the workpiece into its reference position determines the error in their relative dispositions.

While the form of apparatus and the method of approach herein described constitute the preferred embodiment of the invention, it is to be understood that the invention is not limited to the precise form of apparatus and method, and that changes may be made therein without departing from the scope of the invention which is defined in the appended claims.

I claim:

1. An apparatus for gauging the dimensional characteristics of a part having a supporting portion and the disposition of the part with respect to its supporting portion comprising a mounting means for the part supporting portion, carrying means including a plurality of interpivoted members carrying said mounting means in said apparatus for adjustable pivoting about a pair of mutually perpendicular axes and to position said supporting portion in a predetermined reference position in said apparatus, a plurality of gauging elements carried by said apparatus for simultaneous gauging association with a plurality of points defining the transverse curvature of a surface of the part, a corresponding plurality of indicating means, each of which is operatively connected to and controlled by one of said gauging elements, and having predetermined readings when the gauging elements are associated with a perfect part held in the reference position, means supporting said indicating means in fixed adjacent relationship in the apparatus, whereby with the part supporting portion supported in a predetermined reference position in the apparatus the general relative disposition of the part and its supporting portion can be determined from the pattern of deviations from the predetermined readings as shown on the indicating means, said carrying means including adjusting means for adjustably pivoting the mounting means and the part supporting portion about each of said axes to thus normalize the pattern of indications, and further indicating means associated with the adjusting means, whereby the first mentioned plurality of indicating means will show the dimensional characteristics of the part itself and the indicating means associated with the adjusting means will indicate the necessary movement of the part supporting portion from its reference position and the disposition of the part with respect to its supporting portion.

2. An apparatus for gauging the dimensional characteristics of a blade and the disposition of the blade with respect to its base comprising a mounting means for said blade base, means carrying said mounting means in said apparatus for free pivoting movement about a first axis and for adjustable pivoting about a second axis perpendicular to said first axis, said blade base being positioned in a reference position about said second axis, means in said apparatus to engage said blade and pivot the mounting means about the axis of free pivoting and to locate the blade in a reference position about said first axis, indicating gauge means associated with said blade mounting means for indicating the movement thereof about the axis of free pivoting from the position it would occupy for a perfect blade in locating said blade in its reference position about that axis and thereby indicating the error in the disposition of the blade relative to its base portion about said first axis, a plurality of gauging elements carried by said apparatus for gauging association with distributed points along a blade face, a corresponding plurality of indicating means operatively connected for control by the respective gauging elements and having predetermined readings when their respective gauging elements are associated with a perfect blade held in the reference position, means supporting the indicating means in fixed positions in said apparatus and in adjacent relationship to one another, whereby patterns of indicating means deviations from the predetermined readings will indicate deviations of the part from the desired relationship with respect to its supporting portion, said carrying means including adjustable means for adjustably pivoting the mounting means and the blade base about the second axis and compensating for deviations resulting from errors in the disposition of the blade with respect to its base about the second pivot axis with respect to the corresponding disposition of a perfect blade, and an indicating means associated with the adjustable means, whereby the first mentioned plurality of indicating means will show the dimensional characteristics of the part and the indicating means associated with the adjustable means will show the necessary movement of the blade base from its predetermined reference position about said second axis and the disposition of the blade with respect to its base about that axis.

3. An apparatus for gauging the dimensional characteristics of a blade and the disposition of the blade with respect to its base comprising a mounting means for said blade base, means carrying said mounting means in said apparatus for adjustable pivoting about first and second mutually perpendicular axes and to position said blade base in predetermined reference positions about said axes, said carrying means also including means supporting said mounting means for free pivoting about a third axis perpendicular to said first and second axes, means in said apparatus to locate said blade in a reference position about said third axis, indicating gauge means associated with said mounting means for indicating the movement thereof from the position it would occupy for a perfect blade in locating said blade in its reference position about said third axis and thereby indicating the error in the disposition of the blade relative to its base portion about that axis, a plurality of gauging elements carried by said apparatus for gauging association with distributed points on the blade surface, a corresponding plurality of indicating means operatively connected for control by the respective gauging elements, and having predetermined readings when the respective gauging elements are associated with a perfect blade held in the reference positions, means supporting the indicating means in said apparatus in adjacent relationship to one another, whereby patterns of indicating means deviations from the predetermined readings will indicate deviations of the part from the desired relationship with respect to its supporting portion, said carrying means including adjustable means for moving the blade base about the first and second axes and compensating for deviations of the blade relative to its base about the first and second axes with respect to the corresponding dispositions of a perfect blade, and indicating means associated with the adjustable means, whereby the first mentioned plurality of indicating means will show the dimensional characteristic of the part and the indicating means associated with the adjustable means will show the necessary movement of the blade base from its predetermined reference positions and the disposition of the blade with respect to its base about the first and second axes.

4. An apparatus for gauging the dimensional characteristics of a blade and the disposition of the blade with respect to its base, comprising a mounting means for the blade base, means supporting said mounting means in said apparatus having three mutually perpendicular pivot axes through said base corresponding to lean, warp and tilt and intersecting at a point in the mounting means for the blade base, locating means in said apparatus for locating said blade in a reference position about its lean axis, indicating means associated with said mount for indicating the movement thereof from the position it would occupy for a perfect blade in locating the blade in its lean reference position, thereby indicating the lean disposition of the blade with respect to its base, a plurality of gauging elements carried by said apparatus for gauging association with distributed points on the blade surface, a corresponding plurality of similarly calibrated indicating means respectively connected to each of the gauging elements and having indicating elements therein, means supporting said indicating means in said apparatus in adjacent relationship, control means for adjusting the plurality of indicating means to arrange the indicating elements to have a predetermined simple pattern with respect to one another when a theoretically perfect blade held in reference positions about the aforementioned axes is engaged by the gauging elements, thus giving a graphic presentation of the critical relationships between the blade and its base, patterns of deviations from the predetermined simple pattern indicating that the blade is not perfectly situated relative to its base, and calibrated adjusting means for said mounting means to adjust the position of the blade base about the axes of warp and tilt to compensate for warp and tilt variations as indicated in the said graphic presentation and to give a reading of warp and tilt variations of the blade with respect to its base, whereby indications as to lean, warp and tilt of the blade relative to the base and the dimensional characteristics of the blade itself are obtained.

5. An apparatus for gauging the dimensional characteristics of a blade and the disposition of the blade with respect to its base, comprising a mounting means for the blade base carried in said apparatus, said mounting means having a plurality of pivot axes through said base, means in said apparatus for locating said blade in a reference position about one of such axes, air leakage gauging means associated with said mount for gauging the movement thereof from its position for a perfect blade in locating the blade with respect to said one axis, a plurality of air leakage gauging elements carried by said apparatus for association with distributed points on the blade surface, the leakage therethrough being controlled by the proximity of the blade surface at the respective point, a corresponding plurality of indicating means comprising tapered transparent tubes having floating indicating elements therein, means connecting each of said tubes to one of said air leakage gauging elements for control of the respective float position by the controlled leakage, means supporting said transparent tubes in the apparatus in side by side parallel relationship, the indicating elements occupying positions in the transparent tubes giving a predetermined simple pattern when the air leakage gauging elements are associated with a perfect blade held in reference positions about the aforementioned axes, so as to give a graphic presentation of the critical relationships between the blade and its base, patterns of deviations from the predetermined pattern indicating that the blade is not perfectly situated relative to its base, and calibrated adjusting means for said mounting means to adjust the position of the blade base about the other of said axes to compensate for errors in the disposition of the blade with respect to the base about said other axis as indicated by said graphic indicating means and to give a reading of the variations of the blade with respect to its base, whereby indications as to the disposition of the blade about a plurality of axes relative to its base and the dimensional characteristics of the blade itself are obtained.

6. An apparatus for gauging the dimensional characteristics of a blade and the disposition of the blade with respect to its base, comprising a mounting means for the blade base carried in said apparatus, said mounting means having pivot axes through said base corresponding to lean, warp and tilt, means in said apparatus for locating said blade in a reference position about its lean axis, air leakage gauging means associated with said mount for gauging the movement thereof from its position for a perfect blade in locating the blade in its lean reference position thereby indicating the corresponding lean position of the blade with respect to its base, a plurality of air leakage gauging elements carried by said apparatus for association with distributed points on the blade surface, the leakage therethrough being controlled by the proximity of the blade surface at the respective point, a corresponding plurality of indicating means comprising tapered transparent tubes having floating indicating elements therein, means connecting each of said tubes to one of said air leakage gauging elements for control of the respective float position by the controlled leakage, means supporting said transparent tubes in the apparatus in side by side parallel relationship, the indicating elements occupying positions in the transparent tubes giving a predetermined simple pattern when the air leakage gauging elements are associated with a perfect blade held in reference position about the aforementioned axes, so as to give a graphic presentation of the critical relationship between the blade and its base, patterns of deviations from the predetermined pattern indicating that the blade is not perfectly situated relative to its base, and calibrated adjusting means for said mounting means to adjust the position of the blade base about the warp and tilt axes to compensate for warp and tilt variations as indicated on said graphical indicating means and to give a reading of warp and tilt variations of the blade with respect to its base, whereby indications as to lean, warp and tilt of the blade relative to the base and the dimensional characteristics of the blade itself are obtained.

7. An apparatus for gauging the dimensional characteristics of an elongated part having a supporting portion and the disposition of the part with respect to its supporting portion comprising a mounting means carried in said apparatus for positioning the supporting portion in a predetermined reference position in said apparatus, a plurality of gauging elements carried by said apparatus for association with distributed points on the part surface, said elements being arranged in a number of opposing pairs on opposite sides of the part grouped in gauging zones along the axis thereof, a corresponding plurality of indicating means each of which has an indicator which moves along a straight line, means connecting each of the indicating means to one of said gauging elements, means mounting the indicating means in said apparatus adjacently and relatively parallel to each other, control means for adjusting the indicating means so that their indicators are relatively disposed along a straight line when the gauging elements are associated with a perfect part held in the predetermined reference position, opposing pairs of gauging elements being connected to pairs of indicating means along side one another giving a readily read indication of part thickness at the respective location, and indicating means which are associated with elements in the same gauging zone of the part being arranged adjacently, for a graphic presentation of the deviation of corresponding points on the part surface from their reference positions whereby patterns of deviations are shown by the indicators indicate that the part is not perfectly disposed relative to its supporting portion, said mounting means including adjusting means for restoring said indications to a generally straight line by moving the part supporting portion, and indicating means associated with the adjusting means, whereby the first mentioned plurality of indicating means show the dimensional characteristics of the part and the indicating means associated with the adjusting means show the necessary movement of the part supporting means from its predetermined reference position and the disposition of the part with respect to its supporting portion.

8. An apparatus for graphically presenting the dimensional characteristics of a part comprising means carried in said apparatus for supporting the part in the apparatus, a plurality of gauging elements, means for supporting said gauging elements in said apparatus for association with distributed points along the part, said gauging elements being arranged in opposed pairs on opposite sides of the part in gauging zones along the part, the gauging elements associated with one side of said part including means responding in a given sense to work surface displacement and the gauging elements associated with the opposite side of said part including means responding in a reverse sense to displacement of the respective work surface, a corresponding plurality of indicating means, each of which has an indicator which moves along a straight line, means mounting said indicating means vertically and adjacently in said apparatus, said indicating means being operatively connected, one to each of said gauging elements, opposing pairs of gauging elements being connected to pairs of indicating means along side one another to thereby give an easily read indication of the thickness of the part at that position, groups of said indicating means which are associated with gauging elements of a common gauging zone along the part being arranged adjacently in said apparatus, control means for adjusting the indicating means to arrange the indicators along a horizontal line when a perfect part held in a reference position is being gauged, whereby an indication of the deviation of each respective point from its reference position is obtained and a graphical presentation of the dimensional characteristics of the part surface and the relationship of the part with respect to its supporting portion is obtained.

9. A gauging means for determining the lean error of a blade about its base with respect to a corresponding disposition of a perfect blade comprising a mounting means for said blade base, means carrying said mounting means in said gauging means for movement about the blade lean axis, locating means in said gauging means for locating said blade in a reference position about its lean axis, said locating means comprising two opposed carriers slidably mounted in the gauging means, stop means for positioning said carriers relative to the blade support, one of said carriers having a locating projection thereon and the opposed carrier supporting a resilient means for biasing the blade against the locating projection, and a gauging device including an indicating means, associated with the movable blade support for indicating the movement of the blade support about the blade lean axis to position the blade in its reference position and thereby give an indication of the lean of the blade with respect to its base.

10. Gauging apparatus for determining the error in the disposition of an elongated part about an axis passing through its supporting portion with respect to the corresponding disposition of a perfect part and its supporting portion, comprising a support, work holding means on the support for holding the workpiece supporting portion for movement about the aforementioned axis, a pair of opposed carriers movably mounted on said support at opposite sides of the workpiece for movement towards and from the workpiece support, stop means for limiting the movement of the carriers towards the workpiece, control means for moving the carriers from and towards the workpiece, one of said carriers having means thereon for locating the workpiece in a predetermined reference position about the axis through its supporting portion, the opposing carrier having resilient means thereon for biasing the workpiece into contact with the locating means, an indicating means associated with the work holding means for indicating the necessary movement in locating the workpiece in its reference position from the position the workpiece support holding means would occupy for a perfect part and base and thereby giving a measurement of the error in the disposition of the workpiece with respect to its supporting portion.

11. The method of determining the dimensional characteristics of a part having body and a supporting portion and angular disposition of the body with respect to the supporting portion comprising the steps of locating the supporting portion in a predetermined reference position, gauging the disposition of distributed points on the body surface with respect to known reference points for the body of a perfect part so located, angularly adjusting the supporting portion to locate the body in its reference position, determining the dimensional characteristic of the body by again gauging the disposition of the distributed points, and determining the disposition of the body of the part with respect to its supporting portion by gauging the necessary angular adjustment of the supporting portion from its reference position in placing the body into its reference position.

12. The method of determining the angular disposition of the body of a part with respect to the supporting portion of the part comprising the steps of locating the supporting portion in a predetermined reference position, gauging the disposition of the distributed points on the surface of the body of the part with respect to known reference points for the body of a perfect part so located, angularly adjusting the supporting portion to locate the body in its reference position, and determining the angular disposition of the body of the part with respect to its supporting portion by gauging the necessary angular adjustments of the supporting portion from its reference position in placing the body in its reference position.

13. Gauging apparatus for simultaneously checking the contour of desired opposed locations of the same workpiece and the disposition of the workpiece with respect to its supporting portion comprising a support, work holding means on the support for holding the workpiece supporting portion in a predetermined position, a pair of opposed carriers movably mounted on said support on opposite sides of the workpiece and work holding means for movement towards and from the workpiece, stop means cooperating between said support and each of said carriers for limiting the movement of each carrier towards the workpiece at a predetermined stationary gauging position on the base, control means for moving the carriers towards and from stationary positioning association with said stop means and the workpiece, each carrier supporting a series of gauge heads provided with work controlled gauging means for simultaneously gauging association with a plurality of points defining the transverse curvature of a surface of the part, indicating means being mounted in said gauging apparatus and responsive to said gauging means, each of said gauging means including a body portion fixed to the respective carrier and a movable work contactor for positioning engagement with the workpiece, said indicating means being continuously responsive to relative positioning between each body and the associated contactor for continuous gauging indication during positioning engagement of the contactors with the workpiece whereby dimensional characteristics at a plurality of points and workpiece position are continuously indicated during workpiece adjustment, means mounting said holding means on said support for movement on a plurality of axes relative to said carriers and to said gauging means, adjustment means between said work holding means and said support for adjustably positioning a workpiece relative to said carriers and said gauge heads on each of said axes to compensate for deviations of the indicating means resulting from variations of the workpiece with respect to its supporting portion, by moving said supporting portion, and an indicating means responsive to the relative adjustment between the work holding means and said support for indicating the movement of the supporting portion of the workpiece and the disposition of the workpiece with respect to its supporting portion.

14. An apparatus for gauging a turbine blade or the like and analyzing a number of critical conditions of the blade including its relationship with respect to its base comprising mounting means carried in said apparatus for supporting said blade base in said apparatus in reference positions about the axes of blade tilt and warp, and free floating about the axis of blade lean, a plurality of gauging elements, slidable carriers mounted in said apparatus for movement towards and from the blade base mounting means, stop means for locating said carrier means in a predetermined disposition relative to the blade base mounting means, means supporting the gauging elements on said carriers in groups of opposed pairs on opposite sides of the blade in gauging zones along the length of the blade, an indicating panel mounted on said apparatus having a plurality of indicating means mounted therein operatively connected respectively at each of said gauging elements and having indicators therein movable along straight lines the indicating means being mounted vertically in the panel and indicating the deviation of the respective gauging element point on the blade from the location of a corresponding point on the surface of a perfect blade held in the aforementioned reference positions, adjustment means for the indicating means to locate the indicators along a horizontal straight line when a perfect blade so positioned is being gauged, groups of indicating means corresponding to groups of gauging elements in a common gauging zone being arranged adjacently in said panel, whereby a graphical presentation of the locations of the respective points on the blade is presented and an indication of the disposition of the blade with respect to its base is obtained from the pattern of deviations from the horizontal line, one of said carriers having a locating projection thereon for locating the blade about its lean axis, the other carrier having resilient means thereon for biasing the blade against the locating means of the other carrier, and an indicating means associated with the blade mounting means for measuring the movement of the mounting means about its lean axis from the position it would occupy for a perfect blade and indicating the lean disposition of the blade with respect to its base, calibrated means for adjusting said mounting means about the warp and tilt axes to compensate for the pattern deviations of the graphical presentation from the horizontal straight line by moving the blade through its base, and an additional adjustment means supporting said blade base mounting means and its calibrated adjustment means in said apparatus for quick adjustments between predetermined limits about the blade warp axis, whereby upon return of the gauging indications to a generally horizontal straight line by use of the quick adjustment means in conjunction with the calibrated adjustment means the gauging indications give a measure of the contour of the blade and the various adjusting means give a measurement of the warp and tilt variations of the blade with respect to its base.

15. An apparatus for gauging a turbine blade or the like and analyzing a number of critical conditions of the blade including its relationship with respect to its base comprising mounting means carried in said apparatus for supporting said blade base in said apparatus in reference positions about the axes of blade tilt and warp, and free floating about the axis of the blade lean, a plurality of gauging elements, slidable carriers mounted in said apparatus for movement towards and from the blade base mounting means, stop means for locating said carrier means at a predetermined disposition relative to the blade base mounting means, means supporting the gauging elements on said carriers in groups of opposed pairs on opposite sides of the blade in gauging zones along the length of the blade, an indicating panel in said apparatus having a plurality of indicating means mounted therein operatively connected respectively with each of said gauging elements and having indicators therein movable along straight lines, the indicating means being mounted vertically in the panel, and indicating the deviation of the respective gauging element point on the blade from the location of a corresponding point on the surface of a perfect blade held in the aforementioned reference positions, adjustment means for the indicating means to locate the indicators along a horizontal straight line when a perfect blade held in the aforementioned reference position is being gauged, opposed pairs of elements being connected to pairs of indicating means located alongside one another in the panel whereby an indication of blade thickness at the corresponding position can be obtained, and groups of indicating means corresponding to groups of gauging elements in a common gauging zone being arranged adjacently and in order across the panel corresponding to their paired positions across the blade, whereby a graphical presentation of the locations of the respective points on the blade is presented and an indication of the disposition of the blade with respect to its base is also obtained from the pattern of the deviations, one of said carriers having a locating projection thereon for locating the blade about its lean axis, the other carrier having resilient means thereon for biasing the blade against the locating means of the other carrier, and an indicating means associated with the blade mounting means for measuring the movement of the mounting means about its lean axis from the point it would occupy for a perfect blade and indicating the lean disposition of the blade with respect to its base, and calibrated means for adjusting the mounting means about the warp and tilt axes to compensate for the pattern deviations of the graphical presentation from the horizontal straight line by moving the blade through its base, whereby upon return of the gauging indications to a generally horizontal straight line the gauging indications give a measure of the contour of the blade, the centrality of the blade on its base and its thickness and the calibrated adjusting means give a measurement of the warp and tilt variations of the blade with respect to its base.

16. A gauging apparatus comprising a pair of oppositely directed gauging plungers, work contactors at the outer ends thereof, means supporting said plungers for axial sliding to relative positions as determined by engagement of the work contactors with opposite sides of a common workpiece, means adjacent the inner end of each of said plungers providing a fluid leakage orifice, means positioned by work controlled movements of one of said plungers for reducing fluid leakage through the associated orifice with inward plunger movements, means positioned by work controlled movements of the other of said plungers for increasing fluid leakage through the associated orifice with inward plunger movements, means connected to each of said orifices and adapted for connection to a source of fluid under pressure and indicating means responsive to the fluid leakage through the leakage orifices and the actuation of the gauging plungers.

17. Gauging apparatus comprising a base, a pair of substantially opposed work contactors having outwardly disposed work contacting surfaces, means supporting said work contactors from said base for outward movement to engage opposite sides of a common workpiece, means associated with each of said work contactors providing a fluid leakage orifice, means positioned by work controlled movement of one of said work contactors for reducing fluid leakage through the associated orifice with inward work contactor movements, means positioned by movement of the other of said work contactors for increasing fluid leakage through the associated orifice with inward work contactor movements, means connected to a first of said fluid leakage orifices including a gauge and a source of fluid under controlled pressure, means connected to the other of said fluid leakage orifices including a gauge and a source of fluid under pressure, each of said gauges including a vertically disposed indicating tube having indicating means therein which operate along the length of the tube in accordance with leakage through the associated fluid leakage orifice, and means supporting said indicating tubes in relatively parallel adjacent relationship in said apparatus, whereby a shift in the disposition of the workpiece is indicated by a movement of both indicating means in the same direction and the displacement between the workpiece sides is always indicated by the vertical displacement between the indicating means.

18. An apparatus for gauging the dimensional characteristics of a part, said apparatus comprising a base, means for supporting said part from said base in gauging position, a plurality of gauging means carried in said apparatus in gauging association with oppositely facing surface portions of said part, each of said gauging means including a work contactor carried for outward movement into engagement with one of the surface portions and having an outwardly facing work engaging surface, means supporting said gauging means from said base in a plurality of oppositely disposed pairs all lying in a common gauging plane intersecting the surface portions of the part, the work contactor of one of each oppositely disposed pair of gauging means engaging one of the surface portions of the part and the work contactor of the other gauging means of each pair engaging the oppositely facing surface portion of the part, means included in each of the plurality of gauging means associated with one of said surface portions having a given sense of response for inward movements of the respective work contactor and an opposite response for outward movements of the work contactor, means included in each of the plurality of gauging means associated with the oppositely facing surface portion of the part responsive to inward and outward work contactor movements in a reverse sense, a plurality of indicators including indicating means having a straight line movement, means supporting said indicators in relatively parallel, adjacent relationship, means connecting said indicators, one to each of said gauging means, for response thereto, each immediately adjacent pair of indicators being similarly connected to an oppositely disposed pair of gauging means and the pairs of indicators being operatively connected, in order, to pairs of opposed gauging means as arranged across the oppositely facing surface portions of the part.

19. An apparatus for gauging the dimensional characteristics of a part, said apparatus comprising a base, means for supporting said part from said base in gauging position, a plurality of gauging means carried in said apparatus in gauging association with opposite sides of a common part, each of said gauging means including a work contactor carried for outward movement into engagement with the respective side of the part, means supporting said gauging means from said base in a plurality of oppositely disposed pairs all lying in a common gauging plane intersecting the opposite sides of the part, the work contactor of one of each oppositely disposed pair of gauging means engaging one side of the part and the work contactor of the other gauging means of each pair engaging the oppositely facing side of the part, means included in each of said gauging means providing a fluid leakage orifice, means positioned by movement of the work contactors associated with a common side of the part for reducing fluid leakage through the associated orifices with inward movements of the work contactors, means positioned by movement of the work contactors associated with the oppositely facing side of the part for increasing fluid leakage through the associated orifices with inward movements of the work contactors, a plurality of indicators included in said apparatus, one operatively connected to each of said gauging means, each of said indicators including a vertically disposed indicating tube having indicating means therein which respond linearly along the length of the tube in accordance with leakage through the associated fluid leakage orifice, each immediately adjacent pair of indicators being similarly connected to an oppositely disposed pair of gauging means and the pairs of indicators being operatively connected, in order, to pairs of opposed gauging means as arranged across the oppositely facing sides of the part, and means supporting said indicators relatively parallel and closely adjacent in said apparatus.

20. A gauging apparatus comprising a base having work supporting means, a pair of gauging units each having a supporting body and a work contactor movable in one direction relative to the respective body upon engagement with the part, means mounting said units on said base positioning said contactors for engagement with a common part, a pair of vertical indicating tubes mounted in side-by-side relationship, one operatively connected to each unit, each of said tubes having indicating means movable rectilinearly therealong, means cooperating between the work contactor of one unit and the associated indicating tube causing the respective indicating means to rise upon contactor movement in said one direction upon engagement with the part, and means cooperating between the contactor of the other unit and the associated indicating tube causing the respective indicating means to move downward upon contactor movement in said one direction upon engagement with the part.

21. Apparatus for gauging dimensional characteristics of a part, said apparatus comprising a base, means for supporting a part on said base in gauging position, a plurality of gauging means in said apparatus, each of said gauging means including a work contactor carried on said base for positioning engagement with the part, means carrying said work contactors in a plurality of oppositely disposed cooperating pairs in association with oppositely facing surface portions of the part in a common gauging plane, each of said gauging means including an indicator having indicating means movable rectilinearly in response to movements of the associated work contactor, means supporting said indicators in parallel, closely spaced relationship with each immediately adjacent pair of indicators being similarly responsive to a cooperating pair of oppositely disposed work contactors and pairs of indicators being operatively associated, in order, with cooperating pairs of oppositely disposed work contactors as arranged across the part, means in the gauging means associated with a common side of the part providing response of the indicating means in one sense upon work contactor movement in a given direction relative to said base and means in the gauging means associated with the opposite side of the part providing response of the associated indicating means in the same sense upon work contactor movement in the same direction, whereby the relative positions of each adjacent cooperating pair of indicating means vary in accordance with part thickness but are substantially unaffected by variations in part position.

22. An apparatus as set forth in claim 21 wherein said supporting means includes releasable mounting means for a part and adjustable means for positioning the part in a plurality of degrees of adjustment, at least one of said degrees of adjustment being by pivoting about an axis of the part.

23. An apparatus as set forth in claim 21 wherein adjacent cooperating indicating means are of contrasting colors for ready determination of dimensional characteristics of a part.

24. An apparatus as set forth in claim 21 wherein said work contactors are carried in a plurality of opposing pairs in each of a plurality of parallel gaging planes along the work, indicators associated with work contactors in a common gauging plane being grouped together in groups arranged in an order corresponding to the sequence of gauging planes along the part.

References Cited in the file of this patent

UNITED STATES PATENTS

| | | |
|---|---|---|
| 2,465,035 | Polk | Mar. 22, 1949 |
| 2,495,891 | Davis | Jan. 31, 1950 |
| 2,629,936 | Croustedt | Mar. 3, 1953 |
| 2,648,912 | Osgood | Aug. 18, 1953 |
| 2,697,879 | Tandler | Dec. 28, 1954 |
| 2,703,457 | Breisch | Mar. 8, 1955 |
| 2,748,490 | Tandler | June 5, 1956 |

OTHER REFERENCES

Product Engineering, page 224, March 1953.